April 4, 1944.   L. B. HUTHSING ET AL   2,346,028
VARIABLE SPEED BELT DRIVE
Filed March 2, 1942   3 Sheets-Sheet 1

LEO B. HUTHSING,
CARADOC MILLS GREGORY,
INVENTORS

BY Hazard & Miller

ATTORNEYS.

April 4, 1944. L. B. HUTHSING ET AL 2,346,028
VARIABLE SPEED BELT DRIVE
Filed March 2, 1942 3 Sheets-Sheet 2

LEO B. HUTHSING,
CARADOC MILLS GREGORY,
INVENTORS

BY Hazard and Miller

ATTORNEYS.

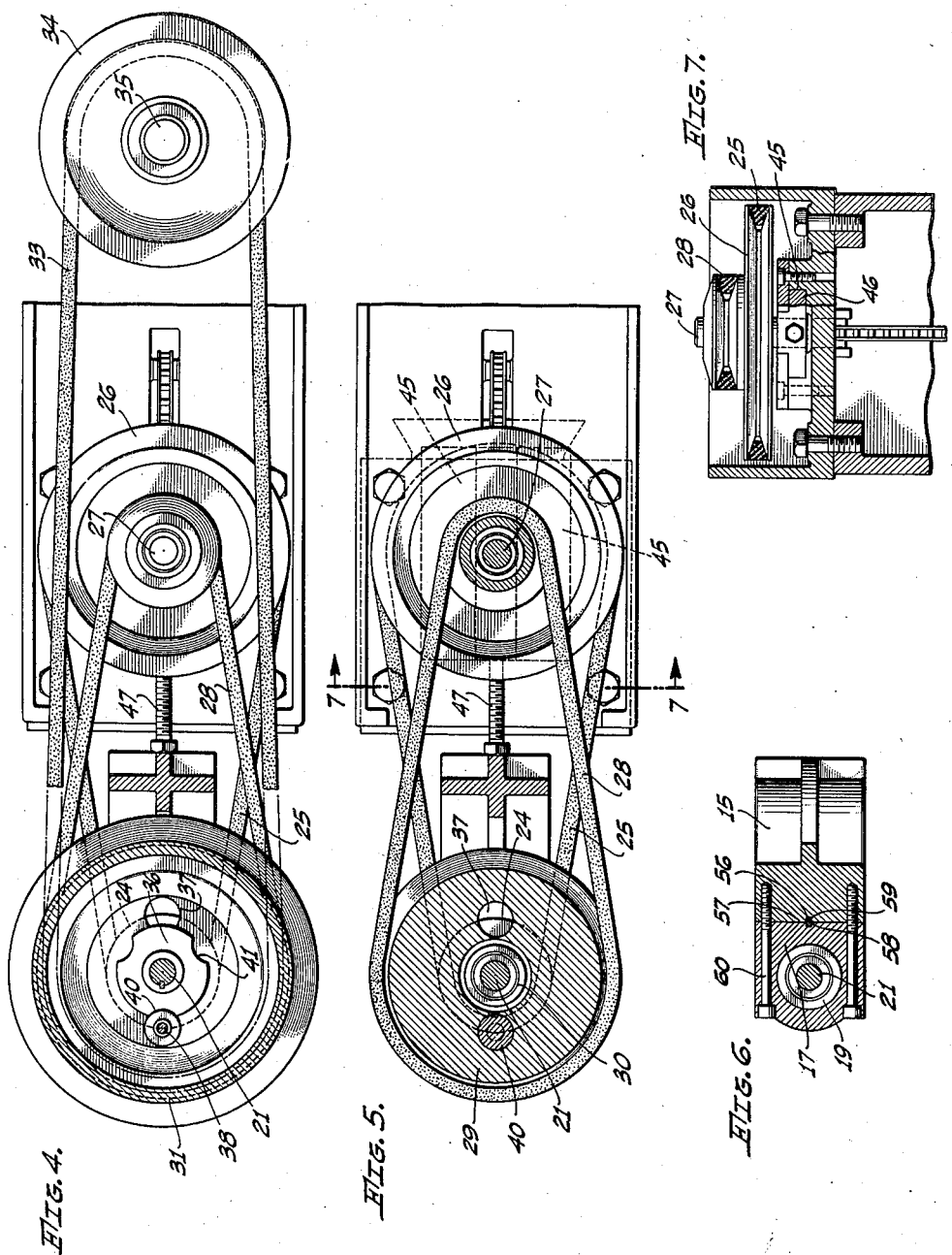

Patented Apr. 4, 1944

2,346,028

UNITED STATES PATENT OFFICE 2,346,028

VARIABLE SPEED BELT DRIVE

Leo Benjamin Huthsing and Caradoc Mills Gregory, Los Angeles, Calif., assignors to Machinery Manufacturing Co., Los Angeles, Calif., a corporation of California Application March 2, 1942, Serial No. 433,016

6 Claims. (Cl. 74—217)

This invention relates to a belt drive for jig borers, drill presses, and the like.

An object of the invention is to provide a relatively simple and inexpensive belt drive wherein the driven shaft or spindle may be driven at a multiplicity of various speeds from a single speed motor.

Heretofore it has been quite customary to drive the spindle or driven shaft from a single speed motor by employing cone or step pulleys on the driving shaft and driven shaft respectively, and secure various speeds by shifting the belt to the various steps on the pulleys. The conventional pulley, however, only has four steps whereas in certain classes of machine work a greater variation in speed is desirable.

The present invention has for its object to provide a relatively simple, inexpensive, and durable belt drive which will enable the securing of the desired greater variation of speed at which it may be desired to drive the driven shaft or spindle and to provide a simple, easily operated mechanism for causing the driving step pulley to be optionally driven directly from the motor or through a speed reducing mechanism.

Another object of the invention is to provide a belt drive having the above-mentioned characteristics wherein the step pulley on the driving shaft may be optionally driven directly from the motor or through a speed reducing belt drive and to provide a structure whereby the speed reducing belt drive may be tightened independently of the belt drive connecting the step pulley on the driving and driven shafts.

Still a further object of the invention is to provide a belt drive for jig borers, drill presses, and the like wherein a novel construction is provided for journalling the driving shaft to facilitate the aligning of the bearings therein with relation to each other and with relation to the driven shaft or spindle.

With the foregoing and other objects in view, which will be made manifest in the following detailed description and specifically pointed out in the appended claims, reference is had to the accompanying drawings for an illustrative embodiment of the invention, wherein:

Fig. 4 is a horizontal section taken substantially upon the line 4—4 upon Fig. 3;

Fig. 5 is a horizontal section taken substantially upon the line 5—5 upon Fig. 3;

Fig. 6 is a horizontal section taken substantially upon the line 6—6 upon Fig. 3; and Fig. 7 is a vertical section taken substantially upon the line 7—7 upon Fig. 3.

Figure 1:
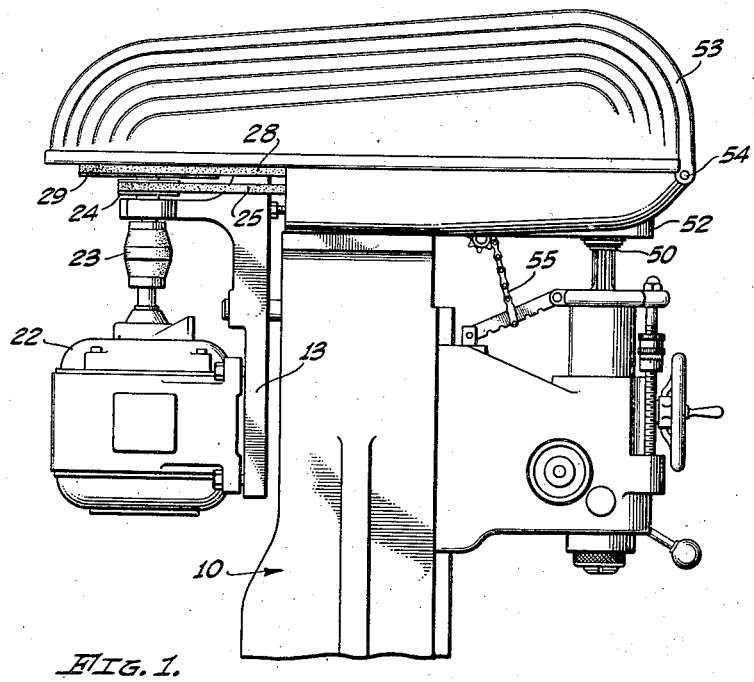
Figure 1 is a view in side elevation of the upper portion of a jig borer embodying the present invention.
Figure 2:
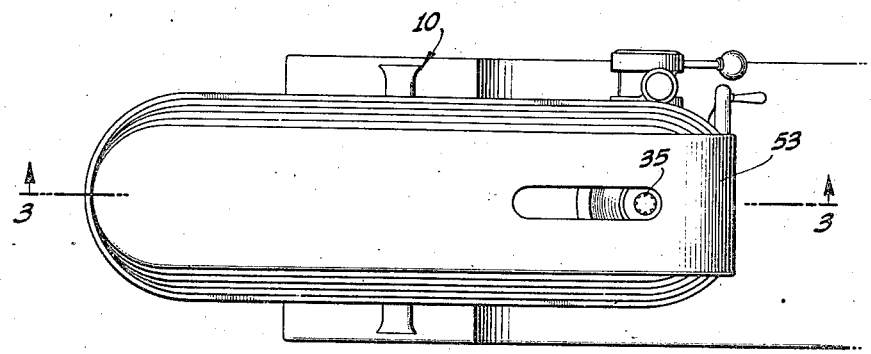
Fig. 2 is a top plan view of the same.

Referring to the accompanying drawings wherein similar reference characters designate similar parts throughout, it will be understood that the present invention is not only applicable to a jig borer but is equally applicable to drill presses or other types of machine tools wherein it may be desirable to drive a driven shaft from a single speed motor or source of power at a multiplicity of different speeds. The jig borer illustrated is merely used for illustrative purposes as one application of the invention.

It consists of a suitable supporting column or pedestal, generally designated at 10, which, adjacent its top, is provided with a bored and reamed hole 11 that receives an arbor 12 of a driving shaft support or hanger 13. The support or hanger 13 is adjustable with respect to the pedestal 10 by sliding the arbor 12 in or out of the hole 11. The arbor is held in adjusted position by means of a set screw 14. The hanger 13 provides two vertically spaced arms 15 and 16 on which are mounted bearing bosses 17 and 18 which receive anti-friction bearings 19 and 20 for a driving shaft 21 which is driven by any suitable source of power, such as for example a single speed electric motor 22 which is preferably mounted on the hanger 13 and which is connected to the driving shaft by a flexible coupling 23.

On the driving shaft 21 there is keyed a driving pulley 24 which is connected by a belt 25 to the large sheave of a step pulley or counter-pulley 26 that is rotatably mounted on a gudgeon or counter-shaft 27. The small sheave of the step pulley or counter-pulley 26 is connected by a belt 28 to a pulley 29 that is loose on the driven shaft 21. Preferably this loose pulley 29 is equipped with an anti-friction bearing 30. A cone or step pulley 31 which preferably has four sheaves is also loose on the driving shaft 21 and is preferably equipped with anti-friction bearings 32. This cone or step pulley 31 is connected by a belt 33 to a cone or step pulley 34 that has a splined connection with a vertically movable spindle 35 that constitutes the driven shaft. The tool that is to effect the boring or drilling is mounted in a chuck on the bottom of this spindle or driven shaft 35 and is lowered toward the work by lowering the spindle or driven shaft 35 through the pulley 34.

Figure 3:
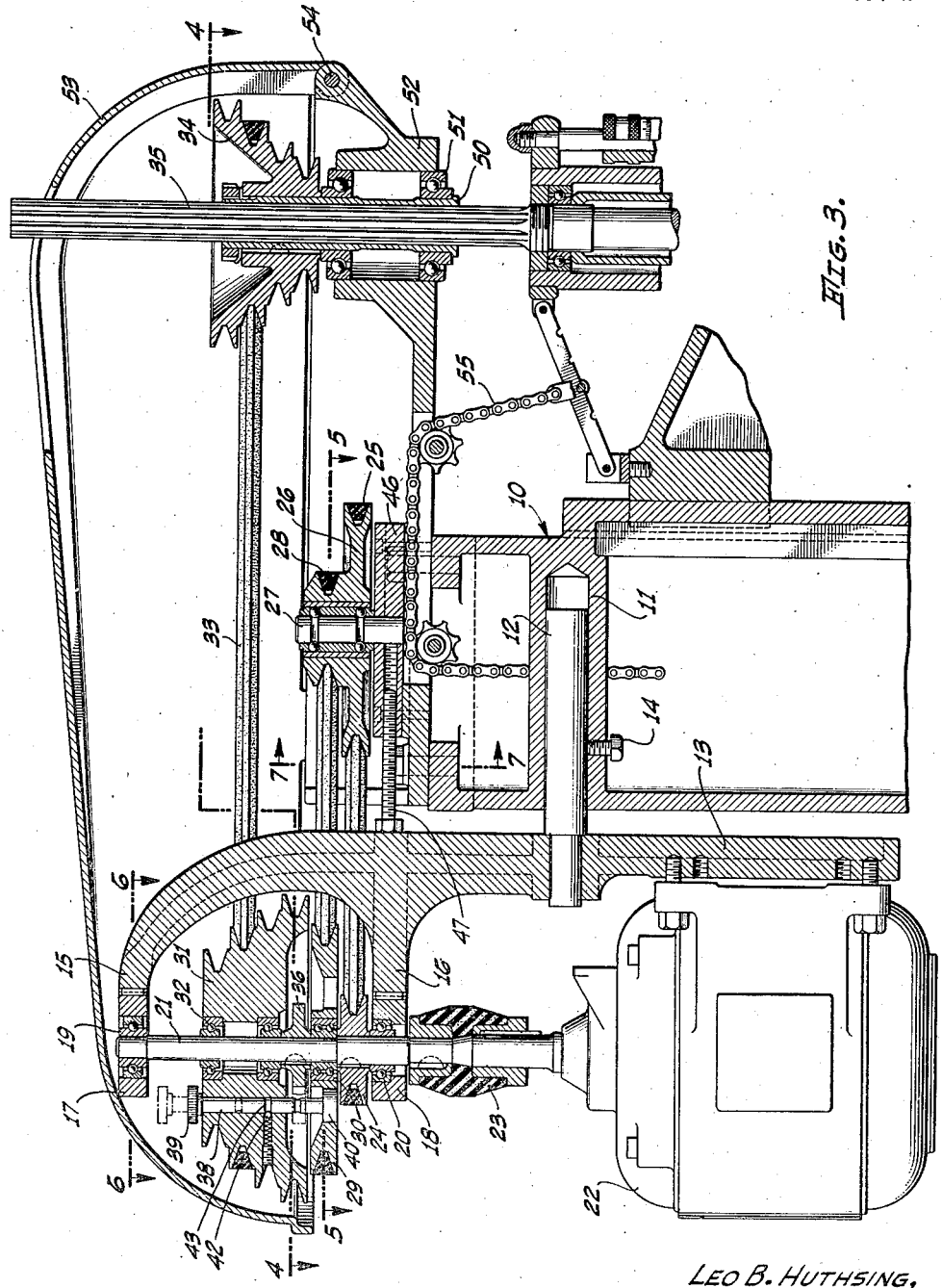
Fig. 3 is a vertical section taken substantially upon the line 3—3 upon Fig. 2 in the direction indicated.

Between the loose pulley 29 and the cone or step pulley 31 a disc 36 is keyed to the driving shaft 21. This disc is peripherally notched, see Figs. 3 and 4, and while the number of notches formed in the periphery of this disc may vary there are preferably three of such notches as clearly illustrated in Fig. 4. In the web of the loose pulley 29 therebelow there are formed apertures 37, the inner portions of which may be caused to align with the arcuate notches in the periphery of disc 36.

A lock is provided for optionally connecting the cone or step pulley 31 with the disc 36 or with the loose pulley 29. This lock comprises a vertically reciprocable rod 38 having a handle 39 and a cylindrical head 40 which, when in the full line position illustrated in Fig. 3, enters one of the apertures 37 in the loose pulley 29. In this position it will be noted that the side of the rod above the head 40 clears the periphery of the disc 36. When the rod 38 is in the elevated position shown in dotted lines in Fig. 3, the head 40 occupies a position entering one of the notches 41 in the periphery of the disc 36. This lock is maintained in either of these two positions by a spring urged ball 42 that is urged to enter the grooves 43 on the rod. In this manner, if the lock is in the full line position shown in Fig. 3, the step or cone pulley 31 is connected to the loose pulley 29 and the disc 36 is released or disengaged. Consequently, in the full line position shown the drive from the motor 22 to the driven shaft 35 is through driving pulley 24, belt 25, counter-pulley 26, belt 28, loose pulley 29, step pulley 31, belt 33, and step pulley 34.

In this drive, because of the relative diameters of pulleys 24, 29, and the sheaves of the counter or mule pulley 26 the spindle or driven shaft 35 will be driven at a reduced speed. This reduced speed can of course be varied by shifting belt 33 to any of the desired steps on the step or cone pulleys 31 and 34. If the lock is in the elevated or dotted line position shown in Fig. 3, the drive between motor 22 and the spindle or driven shaft 35 is direct, namely through disc 36, step or cone pulley 31, belt 33, and step pulley 34. In this position the spindle or driven shaft 35 will be driven at a higher speed which again can be adjusted or varied by shifting the belt 33 to the various steps of the step pulley. In this position belts 25 and 28 continue to be driven and the loose pulley 29 will consequently be rotated. However, this rotation of the loose pulley 29 is merely idle due to the direct drive from the motor 22 to disc 36 and to the step or cone pulley 31. In this manner, by a simple shift of the handle 39 either a direct drive or a reduced drive may be optionally secured.

On the top of the pedestal or supporting column 10, ways 45 are provided for a carriage 46 on which the gudgeon or countershaft 27 is slidable. A screw 47 is threaded into the back of this carriage and has its head bearing against the forward side of the driving shaft support or hanger 13. As this screw is backed out of the carriage 46 it forces the carriage forwardly or away from the hanger 13 thus tightening belts 25 and 28. The tightening of these belts however is independent of belt 33. Belt 33 is tightened by loosening set screw 14 and bodily shifting the hanger 13 rearwardly by sliding the arbor 12 out of the hole 11. During such sliding action to accomplish the tightening of the belt 33, it will be noted that the screw 47 is unaffected and that consequently carriage 46 slides on its ways 45 to whatever position is necessary. Consequently, tightening of belt 33 does not affect in any way the tightness of the belts 25 and 28 and conversely tightening of belts 25 and 28 by screw 47 does not affect the tightness of belt 33. In this manner all belts may be kept at the proper degree of tightness to accomplish satisfactory and efficient driving connections between the motor 22 and the driven shaft or spindle 35.

The shaft or spindle 35 has a splined connection with a sleeve 50 to which the step pulley 34 is keyed. This sleeve is rotatably mounted in bearings 51 housed within an overhanging head 52 mounted on the supporting column or pedestal 10. Cover 53 is hinged to the head as at 54 and may be readily lifted to make the handle 39 readily accessible. The quill for the spindle 35 is counterbalanced by a counterbalance weight, not shown, which is connected to the quill through a chain 55.

A feature of the invention concerns the manner of constructing the arms 15 and 16 of the hanger 13 and the bearing blocks or bosses 17 and 18 so as to be able to secure proper alignment of the bearings 19 and 20. The end faces of the arms 15 and 16 are machined off in the same plane and a keyway indicated at 56, see Fig. 6, is cut therein. The bearing blocks 17 and 18 are then clamped together in side by side relationship and complementary faces 57 are machined thereon with a keyway 58 cut therein. While the bearing blocks 17 and 18 are thus clamped together the necessary apertures to receive the bearings 19 and 20 are drilled therethrough. When these are completed, the bearing blocks are assembled with the hanger 13 and keys 59 are inserted in the keyways which accurately maintain the bearing blocks in perfect alignment. Cap screws 60 can then be inserted into drilled and tapped holes that are drilled through the bearing blocks and into the ends of the arms 15 and 16 of hanger 13. In this way, by relatively simple machine operations a very accurate alignment of the bearings for the driving shaft can be easily secured.

From the above-described construction it will be appreciated that a very simple but highly durable belt drive is secured which permits of eight different speeds of the spindle or shaft 35 although driven by a single-speed motor 22 and although only step pulleys having four steps are employed. A simple shift of the locking device serves to disconnect step pulley 31 from direct drive by the driving shaft 21 and to connect it to the loose pulley 29 that is driven at reduced speed. Conversely, by simply elevating the handle 39 the loose pulley 29 is disconnected and allowed to idly rotate on the driving shaft and a direct drive established between the step pulley 31 and the driving shaft. The belts are readily tightened and those belts leading to and from the counterpulley 26 can be tightened independently of the driving belt 33. Furthermore, adjustment of belt 33 does not in any way affect or modify the adjustment of belts 25 and 28, and vice versa.

While the invention has been described in connection with a jig borer, it will be appreciated that it is equally applicable to any type of construction wherein it is desirable to drive a driven shaft or a spindle at a multiplicity of speeds from a single speed power source.

Various changes may be made in the details of construction without departing from the spirit or scope of the invention as defined by the appended claims.

We claim:

1. A belt drive for jig borers and the like comprising driving, driven, and countershafts, a loose pulley on the driving shaft, means providing a speed-reduction drive between the driving shaft and the loose pulley thereon through the countershaft, a step pulley loose on the driving shaft, a step pulley on the driven shaft, a drive between the step pulleys, and means for optionally locking the step pulley on the driving shaft against rotation relative to the driving shaft so as to be directly driven thereby or locking the step pulley on the driving shaft to the loose pulley thereon so as to be driven thereby at reduced speed, the countershaft being adjustable toward and away from the driving shaft without affecting the adjustment of the drive between the driving and driven shafts.

2. A belt drive for jig borers and the like comprising driving, driven, and countershafts, a loose pulley on the driving shaft, means providing a speed-reduction drive between the driving shaft and the loose pulley thereon through the countershaft, a step pulley loose on the driving shaft, a step pulley on the driven shaft, a drive between the step pulleys, a peripherally notched disc secured against rotation on the driving shaft between the loose and step pulleys thereon, and locking means on the step pulley, said locking means having a head optionally receivable in a notch of the disc or in the loose pulley whereby the step pulley may be optionally connected to the disc for direct drive by the driven shaft or connected to the loose pulley so as to be driven at reduced speed through the countershaft.

3. A belt drive for jig borers and the like comprising driving and driven shafts, step pulleys thereon, a belt drive between the pulleys, the step pulley on the driving shaft being loose thereon, a loose pulley on the driving shaft, means for driving the loose pulley by the driving shaft at reduced speed, a disc keyed to the driving shaft between the step and loose pulleys thereon, and locking means on the step pulley for optionally locking the step pulley to the disc so as to be driven directly by the driving shaft or locking it to the loose pulley so as to be driven thereby at reduced speed.

4. A belt drive for jig borers and the like comprising driving and driven shafts, step pulleys thereon, a belt drive between the pulleys, the step pulley on the driving shaft being loose thereon, a loose pulley on the driving shaft, means for driving the loose pulley by the driving shaft at reduced speed, a peripherally notched disc keyed to the driving shaft between the step and loose pulleys thereon, locking means on the step pulley, said locking means having a head optionally receivable in a notch of the disc to lock the step pulley and disc together, for direct drive by the driving shaft or receivable in a part of the loose pulley to cause the step pulley to be driven by the loose pulley at reduced speed.

5. A belt drive for jig borers, drill presses, and the like comprising a driving shaft, a driven shaft, step pulleys on the shafts, a belt trained over the step pulleys, a driving pulley on the driving shaft, a counter-pulley belt driven by the driving pulley, a loose pulley on the driving shaft belt driven by the counter-pulley, and means for optionally connecting the step pulley on the driving shaft to the driving shaft so as to be directly driven thereby or to the loose pulley on the driving shaft so as to be driven through the counter-pulley, said driving shaft being adjustable toward and away from the driven shaft, and said counter-pulley being adjustable toward and away from the driving shaft independently of the adjustment between the driving and driven shafts.

6. A belt drive for jig borers and the like comprising driving and driven shafts, step pulleys thereon, a belt drive between the pulleys, the step pulley on the driving shaft being loose thereon, a loose pulley on the driving shaft, means for driving the loose pulley by the driving shaft at reduced speed, a peripherally notched disc keyed to the driving shaft between the step and loose pulleys thereon, a locking pin slidable on the step pulley on the driving shaft, said locking pin having an enlarged head optionally receivable in a notch of the disc to lock the step pulley and disc together for direct drive by the driving shaft or receivable in a part of the loose pulley to cause the step pulley to be driven by the loose pulley at reduced speed, the shank of the locking pin in the latter position clearing the periphery of the notched disc.

LEO BENJAMIN HUTHSING.
CARADOC MILLS GREGORY.